United States Patent [19]

Roth et al.

[11] Patent Number: 4,573,192

[45] Date of Patent: Feb. 25, 1986

[54] END OF TRANSACTION CONTROL SYSTEM

[75] Inventors: Richard W. Roth, Scottsdale; William T. Gregor, Phoenix; Michael D. Sherwood, Tempe; Ned Pokrajac, Phoenix, all of Ariz.

[73] Assignee: Engineered Systems Inc., Tempe, Ariz.

[21] Appl. No.: 570,965

[22] Filed: Jan. 16, 1984

[51] Int. Cl.[4] .............................................. G06K 9/00
[52] U.S. Cl. ....................................... 382/1; 235/381; 235/436; 382/61
[58] Field of Search ............... 235/379, 380, 381, 382, 235/449, 436, 437, 438; 340/825.30, 825.31, 825.32, 825.33, 825.34, 825.35; 382/1, 57, 61

[56] References Cited

U.S. PATENT DOCUMENTS

| | | | |
|---|---|---|---|
| 3,283,303 | 11/1966 | Cerf | 340/146.3 |
| 3,627,990 | 12/1971 | Sallach | 235/61.11 |
| 3,629,822 | 12/1971 | Johnson | 340/146.3 |
| 3,686,479 | 8/1972 | Rogers et al. | 235/61.11 |
| 3,763,355 | 10/1973 | Brand, Jr. | 235/61.11 |
| 3,896,292 | 7/1975 | May et al. | 235/61.11 |
| 3,956,615 | 5/1976 | Anderson et al. | 235/381 |
| 4,058,705 | 11/1977 | Cannon | 235/449 |
| 4,085,313 | 4/1978 | Van Ness | 235/419 |
| 4,271,351 | 6/1981 | Bloodworth | 235/493 |
| 4,322,613 | 3/1982 | Oldenkamp | 235/449 |

Primary Examiner—Leo H. Boudreau
Attorney, Agent, or Firm—LaValle D. Ptak

[57] ABSTRACT

In an information computer and data processing system where transactions controlled by the system are initiated and set up by a card inserted to a magnetic strip card reader, provisions are made to terminate the transaction and set the card out of the reader in response to certain conditions of the data supplied by the card reader to the system. Each card to be used with the system has a start character encoded at the beginning of characters corresponding to unique variable data identified by that card. An end character always appears at the end of the unique variable data, followed by an LRC (longitudinal redundancy check) character. Each character on the card also is provided with a parity check bit and a provision is made for detecting a parity or LRC error to terminate the transaction and to set the card out of the reader and to similarly terminate the transaction and set the card out of the reader whenever an end character is detected before a start character. A further provision is made for setting a card out of the reader whenever excessive clock pulses are produced by the reader to the rest of the system within a pre-established time limit.

12 Claims, 3 Drawing Figures

END OF TRANSACTION CONTROL SYSTEM

BACKGROUND OF THE INVENTION

The advent of low cost microprocessors and microcomputers for use in "intelligent" data terminals, and the lower costs and improved efficiency of computer systems in general have resulted in ever-increasing numbers of applications for unattended credit operations, such as automatic bank "tellers", unattended bulk terminal fuel dispensing systems, and the like. Such systems usually are operated in response to the entry of an authorized credit card having variable data encoded on it to identify the user, the types of products, or extent of credit to which the user is entitled, and other information required by the particular system with which the card is used. Usually, the credit card or authorization card is inserted into a card reader. Then, the variable data relative to the specific transaction desired by the user is entered by means of a keyboard or other actuating device to cause the system to perform the desired operation.

A typical system with which such a card reader is used is the automatic product dispensing system disclosed in U.S. Pat. No. 4,085,313 issued Apr. 18, 1978. The system disclosed in this patent is a fully automatic self-service fuel dispensing system in which the transactions are controlled by the insertion of a credit card or identification card document into a card reader. Selected data from the card, as supplied by the card reader, is combined with the variable information relative to the transaction for further processing by the computer system which is utilized to control the operation of the fuel-dispensing devices and to compile and prepare the necessary billing information for the completed transaction at the fueling site.

The credit cards or transaction control document cards which are used in the readers may be encoded in a variety of ways. Typically, encoding has been accomplished in the past by physically punching holes through the cards for utilization with a photoelectric reader. Other systems use magnetically encoded spots in which the data on the card is encoded by means of permanently magnetized slugs or magnetic material laminated between outer layers of the card. Other encoding is accomplished by means of magnetic strips placed on the card and pre-magnetized with the unique data used to identify that card and provide other necessary information for the operation of the system with which it is used.

To ensure that the data supplied by the card to the computer system for effecting the desired transaction is correctly read by the reader and utilized by the system, most readers have a mechanical or quasi-mechanical sensor located in them. This sensor produces a signal which is utilized by the remainder of the system to indicate that the card has been fully inserted into the reader in a proper reading position. Frequently, this is done by locating a columnated light source and a light-sensing diode in the reader in a position where a fully inserted card breaks the column of light between the light source and light-sensing diode. Whenever this occurs, the information is used by the computer and data processing system to indicate that the card is in place; and the transaction continues either to initiate reading the data on the card or to utilize information previously read from the card and stored in a buffer memory for release when the light column has been broken. When the card is withdrawn from the reader, the light source once again causes light to impinge upon the light-sensing diode and a signal indicative of this is obtained from the diode. Subsequent signals then may be used to terminate the transaction and to reset all of the various circuitry operated in conjunction with the reader to prepare the system for a new transaction initiated by the insertion of another card into the reader.

Problems exist in the use of a light source and a light-sensing diode, however, since the environment in which the reader is located frequently is subject to a number of conditions which may interfere with the brilliancy of the light path. For example, readers often are located out-of-doors, and dust and other contaminants may enter the reader and build up on the light-sensing circuitry. In addition, aging of the light source or burning out of the bulb, or even use of different materials for the cards used in the system, can result in faulty operation. This then requires maintenance or other adjustments which are in addition to any which the computer system and the card reader system itself would otherwise require.

Another approach has been to provide a microswitch which is engaged by the edge of the card to provide a similar "card in place" output signal for utilization by the system. Mechanical micro-switches are subject to many of the same disadvantages encountered with the photoelectric system described above. Switch failures occur, the switches tend to stick as a result of contaminants entering the card slot, and the switch also is an additional initial expense in the construction of the reader.

To overcome the disadvantages of these mechanical or quasi-mechanical systems, other attempts for sensing the presence or movement of a card in a card reader have been made. A system which uses a Hall-effect transducer to operate logic for verifying the presence of a card is disclosed in the Patent to May, U.S. Pat. No. 3,896,292, issued July 22, 1975. This system employs a card with a high permeability metal insert in it. The insert is placed to overlie a detecting transducer when the card is in the "read" position in the reader. Whenever the card is moved away from this position, the transducer provides a signal to reset the system logic. While the sensing transducer is not subject to the mechanical failures possible with the photoelectric and micro-switch sensors described above, it requires a specially constructed laminated card in order for it to function. The data sensing in the reader is effected by different circuitry from the circuitry used to sense the card presence.

Two other patents which disclose separate sensors for sensing premature card withdrawal are the patents to Oldenkamp, U.S. Pat. No. 4,322,613, issued Mar. 30, 1982 (using a mechanical sensor), and Cannon, U.S. Pat. No. 4,058,705, issued Nov. 15, 1977. In Cannon, a magnetic card reader is disclosed with a self-balancing nulling circuit. The circuit uses a delay and a comparator to continuously set a reference level for accurate reading of the data from the card, but there is nothing in this system to act as a "card removed" sensor as well as a data reader.

It is desirable to provide a system for controlling the transaction by means of a card inserted into a card reader which does not require separate "card in place" or "card removed" sensors to provide such information.

SUMMARY OF THE INVENTION

Accordingly, it is an object of this invention to provide an improved system for indicating the presence of a document in a document reader.

It is an additional object of this invention to provide a system for monitoring the movement of a document in a document reader.

It is another object of this invention to provide a system for monitoring the sequence of production of pre-established characters from a document being read by a document reader to control the processing of data.

It is a further object of this invention to provide an improved document-reading system.

It is yet another object of this invention to provide an improved magnetic strip document-reading system in which the presence of a fully inserted document into the reader is determined by means of information encoded on the document itself.

In accordance with a preferred embodiment of this invention, documents for use in the system have data characters encoded on them separated by a "start" character and an "end" character. A document reader produces signals on an output thereof representative of data encoded on a document inserted into the reader. A decoder is attached to the output of the reader to identify at least the start and end characters to produce signals uniquely representative of these characters. A utilization system is also coupled with the output of the reader for utilizing the signals representative of the encoded data characters. Finally, a provision is made for responding to the identification of the start and end characters by the system for terminating any transaction initiated in the utilization means in response to the reading of a document by the reader whenever an end character is identified before identification of a start character.

More specific embodiments of the invention include additional provisions for terminating any transaction initiated by the utilization means in response to the reading of a document by the reader when there is failure of a pre-established parity relationship in any character being read by the reader or in a longitudinal redundancy check character comprising a cumulative check on all of the data.

DETAILED DESCRIPTION

Figure 1:
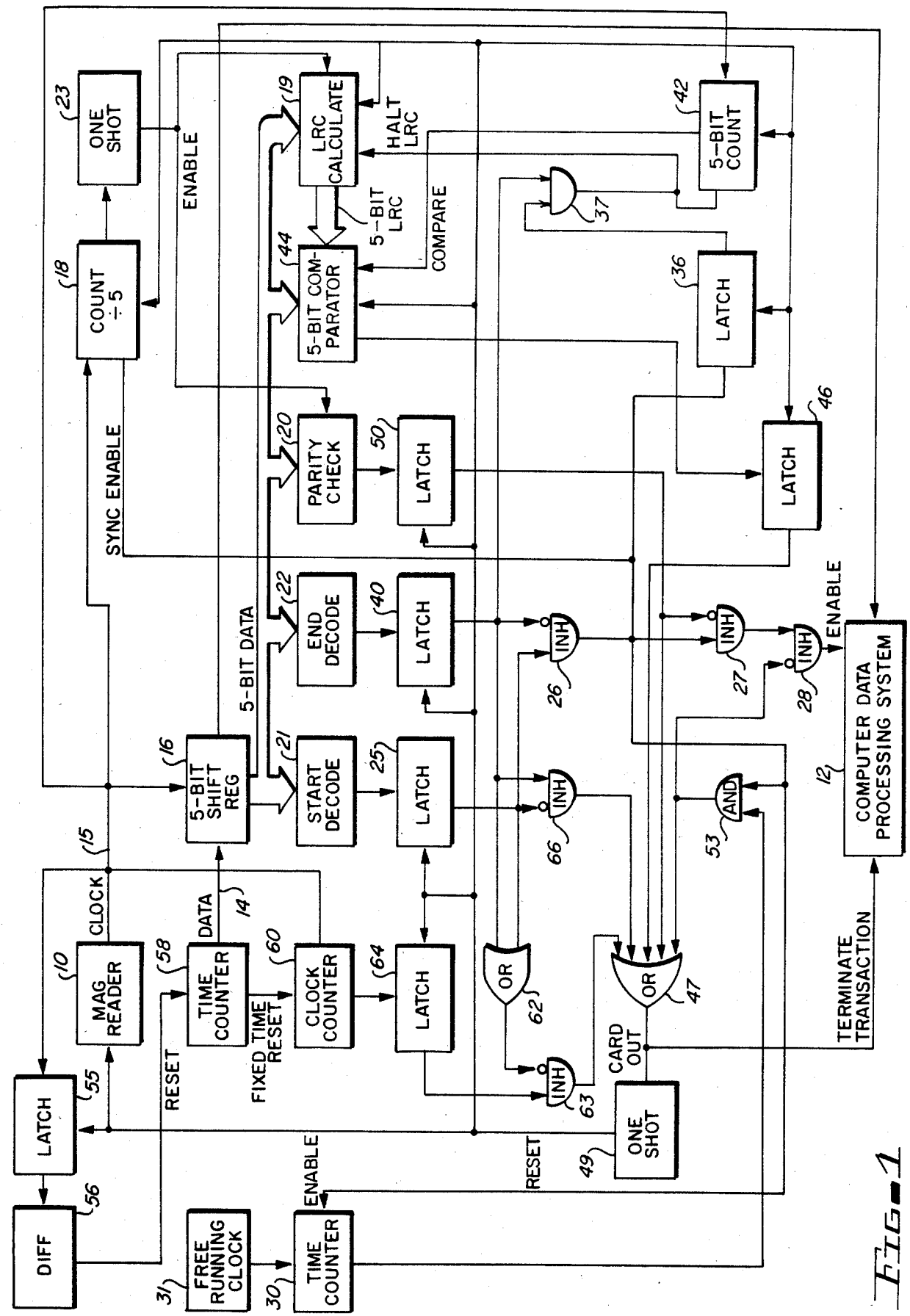
FIG. 1 is a block diagram of a system in accordance with a preferred embodiment of the invention.

Reference now should be made to the drawings which illustrate a preferred embodiment of the invention. FIG. 1 is a block diagram of a circuit which may be used to initiate and terminate a transaction and to control the setting out of a card from a magnetic strip reader used in conjunction with a card-activated system.

The system shown in FIG. 1 utilizes a magnetic strip card reader 10 to read cards or documents to initiate the processing of a transaction by a computer and data processing system 12. The reader 10 and the processing system 12 may be used in conjunction with a system such as the one described in the aforementioned Van Ness U.S. Pat. No. 4,085,313. The magnetic strip card reader, however, utilizes encoded data in the magnetic strip itself to provide an indication of the proper insertion and removal of the card. Each card used with the reader 10 has the variable data characters which are unique to that card (such as driver identification, customer, and the like, for a bulk terminal fueling system) encoded between a "start" character and an "end" character followed by an LRC (longitudinal redundancy check) character. The "start" and "end" characters are always the same for all cards used with the system. The LRC character is a redundancy check which is the sum of data bits of all previous characters.

In addition, each of the data characters and the start, end, and LRC characters are encoded with a parity check bit to provide further insurance that the information supplied from the reader 10 to the remainder of the system is error free. No separate card-in-place switches or photocell devices are used. All of the data for determining whether a card has been properly and fully inserted into the reader is provided from the magnetically encoded track on the card itself.

In the system used in conjunction with FIG. 1, the start, data, and end characters each comprise four bits of binary encoded data plus a parity check bit for a total of five bits. The last bit of each of these characters is the parity check bit.

Figure 3:
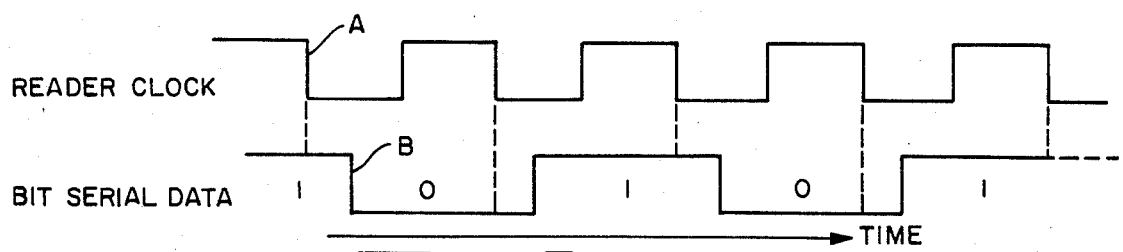
FIG. 3 illustrates waveforms useful in explaining the operation of the circuit of FIG. 1 and the flowchart of FIG. 2.

Standard magnetic strip card readers, such as used for the reader 10, provide data from the reader at a rate determined by the rate at which the card is inserted into and withdrawn from the reader 10. There is no fixed clock rate for this data which is supplied over a serial data line 14 to a 5-bit shift register 16. To properly synchronize this data with the remainder of the system shown in FIG. 1, the reader 10 also supplies a series of clock pulses on an output lead 15 at a rate which is directly proportional to the rate at which the card is inserted into and withdrawn from the reader 10. The clock pulses on the lead 15 are derived from transitions in the serial data supplied over the lead 14, or may be separately encoded on a separate track accompanying the data track 10. In either event, the relationship between the clock pulses and the data is shown in the corresponding waveforms A and B of FIG. 3 for a typical single character of data (waveform B). As is apparent from FIG. 3, the negative-going transitions in the reader clock waveform A occur at a point between the transitions in the data character of waveform B and thus are used to decode and transfer this data in the operation of the system. Since the clock pulses of waveform A are slaved to the rate at which the data appears on the serial data line 14, variations in the frequency of the data supplied over the lead 14 are readily handled by the system without any problems.

The data is supplied to the input of the 5-bit shift register 16, as mentioned above. The shifting of the data through the register is accomplished by the negative-going transitions of the clock pulses over the lead 15 which are supplied to the shift register as shift pulses.

The system initially is cleared by a reset pulse. This reset pulse is applied to a divide-by-five clock pulse counter 18 to set the counter 18 to a zero or initial condition. The manner in which the reset pulse is obtained is described subsequently. As is apparent from an examination of FIG. 1, the clock pulses on the lead 15 also are supplied to the clock pulse counter circuit 18 which counts these pulses and provides an output pulse for every five negative-going clock pulse inputs applied to it. Commencement of counting by the counter 18, however, does not begin until the counter 18 has been enabled by recognition of a "start" character occurring before an "end" character. After this enabling recognition, an output pulse is supplied as an enable pulse from the counter 18 to a parity check circuit 20 (in the form of a standard Exclusive Or gate tree), and an LRC calculation circuit 19.

As the data passes through the shift register 16, the bits in each of the five stages of the register are monitored in parallel by the LRC calculate circuit 19, a parity check exclusive Or gate circuit 20, a start decode gate circuit 21, and an end character decode gate circuit 22. When the system first starts up, the LRC circuit 19 and the parity check circuit 20 are not functioning since they each require an enable pulse from the output of a one-shot multivibrator 23 which, in turn, is triggered by an output pulse of the counter 18 after it has counted five pulses. The counter 18, however, is not enabled to count clock pulses on the lead 15 until there is a detection by the start decode circuit 21 of the presence of a "start" character occurring before an "end" character in the sequence of characters supplied through the shift register 16.

Thus, at the commencement of the reading of a card by the magnetic reader 10, the decoding gate circuits 21 and 22 monitor the information passing through the shift register 16 until a start character is detected by the start decode circuit 21 before an end character is detected by the circuit 22. In normal operation, the start character should occur first. As soon as the bits for a start character are in proper position in the shift register 16, a pulse is obtained from the output of the start decode circuit 21. This sets a latch circuit 25 to store this information until a system reset pulse is supplied to the circuit 25 to ready it for processing a new card by the magnetic reader 10. For a system which has been reset to commence the processing of data and which is operating in a normal proper manner, the output of the latch circuit is passed through three cascaded inhibit gates 26, 27 and 28 to supply an enable signal to the computer data processing system 12. This causes the system to commence the processing of data shifted out of the shift register 16 and supplied to the data input of the system 12. The first bit supplied out of the shift register 16 in this sequence is the first bit of the start character which was decoded by the start decode circuit 21.

At the same time, the output of the Inhibit gate 26, which may be considered a "start before end" output pulse, is applied to the enable input of a time counter circuit 30 to reset the circuit 30 and enable the time counter circuit 30 to commence counting pulses supplied by a free-running clock 31. The clock 31 may be an integral part of the computer data processing system 12 or may be separately provided. The clock 31 produces pulses at a frequency which normally is in excess of the frequency of clock pulses applied over the lead 15 from the reader 10. The time counter 30 counts these pulses and produces an output on its output lead 34 after a time interval arbitrarily selected to be greater than the maximum interval in which an "end" character normally should be obtained on the data output 14 from the magnetic reader 10 following a "start" character. Under normal conditions of operation, no output pulse is produced by the time counter 34 before an "end" character is detected by the end decode circuit 22.

The output of the Inhibit gate 26 also is supplied as an enable input to the divide-by-five counter 18 to permit the counter 18 to commence counting the clock pulses appearing on the lead 15. Thus, the start character initiates the synchronization of the counter 18 with the data being supplied through the shift register 16. The output pulses from the counter 18 occur in synchronization with the last bit of each character of the serial data supplied over the lead 14 to the shift register 16. The pulse produced by the counter 18 at the end of each character causes the one-shot multivibrator 23 to supply an enabling pulse to the LRC calculation circuit 19 and to the parity check circuit 20. If the parity check of the character in the shift register 16 at the time of the enabling pulse is correct, no output is produced from the circuit 20. This again is the normal condition of operation of the system when everything is functioning properly. The pulse supplied to the LRC calculation circuit 19 permits this circuit to add the data present on its inputs at the time the enable pulse appears to the sum of data previously supplied to the circuit 19. This occurs each time a new character passes through the system so that the cumulative sum calculation of the data bits of the characters may be made by the circuit 19.

The output of the gate 26 also sets a latch circuit 36 to enable an And gate 37 for subsequent operation when an "end" character is detected by the end character decoding circuit 22. The latch circuit 36 remains set to this condition until a system reset pulse is applied to it as described subsequently.

As the card continues to be inserted into the reader 10, the data pulses applied from the shift register 16 over the serial data input lead to the computer data processing system 12 are operated upon by the system to set up a transaction in a manner such as described in the above-mentioned Van Ness U.S. Pat. No. 4,085,313.

Each character is checked by the parity check decoder circuit 20 as it passes through the shift register 16 under the control of the enable pulses from the one-shot multivibrator 23. For a normal transaction, where the parity check bit is always correct, no output is ever obtained from the parity check circuit 20. Thus, the system continues to operate.

For a properly functioning system, the variable data characters finally are followed by the "end" character which is decoded by the circuit 22 as it passes through the five-bit shift register 16. As soon as the "end" character is detected by the circuit 22, an output pulse is applied from the circuit 22 to a latch circuit 40. The output of the latch circuit 40 then is passed through the previously enabled And gate 37 to enable a five-bit counter 42 for operation and to terminate the calculation of the LRC character by the circuit 19. As is apparent from an examination of the circuit of FIG. 1, the "end" character is included in the summation calculation by the LRC calculate circuit 19 since that has occurred by the time the output pulse is obtained from the And gate 37 to terminate further calculation by the circuit 19.

The next enable pulse from the one-shot multivibrator 23 then causes the output of the LRC calculation circuit 19 to be supplied to one of two sets of inputs of a five-bit comparator circuit 44 which is enabled by a "compare" enabling output from the five-bit counter 42. This occurs simultaneously with the application of the enable pulse from the one-shot multivibrator 23 to the LRC circuit 19. If the LRC character which has been calculated by the circuit 19 is the same as the encoded LRC character read by the magnetic reader 10 (and now present in the shift register 16), no output is produced by the five-bit comparator 44. This again is the normal operation for a properly-functioning system. Only if there is a failure of the comparison of the calculated LRC bit and the LRC bit read by the reader 10, does the comparator 44 produce an output pulse indicative of this failure. For the present example, assume that no such failure exists, therefore, no pulse is obtained from the output of the comparator circuit 44.

The detection of the "end" character by the end decoding circuit 22 also results in the application of an inhibit signal from the output of the latch circuit 40 to the inhibit input of the Inhibit gate 26. Consequently, the enabling signal which is passed from the output of this gate and through the gates 27 and 28 is removed from the data processing system 12. The system 12 then internally recognizes this as the end of the data being supplied to it, and then continues to process the transaction which is initiated by the insertion of the card into the reader 10 in a normal manner.

If the calculated LRC character and the LRC character read by the reader 10 and present at the outputs of the shift register 16 when the comparator 44 is enabled fails to provide a valid comparison, a signal is obtained from the output of the comparator 44 to operate a latch circuit 46 to indicate this failure. The output of the latch circuit 46 then is applied to one of five inputs of an Or gate 47. Whenever a pulse appears on the output of the Or gate 47, it is used to terminate the transaction in the data processing system 12 and to reset the system and setting the card out of the reader 10. Thus, even though all of the data processed to the point of the LRC character may be proper and results in the operation which has been described previously, if there is an LRC character failure, the pulse from the Or gate 47 is applied to the computer data processing system 12 to terminate the transaction at that point. This pulse also is applied to a one-shot multivibrator 49, the output of which is a reset pulse applied to the magnetic reader 10 to cause the card to be ejected or "set out" from the reader 10. The output of the one-shot multivibrator 49 also is the reset pulse applied throughout the system to cause the system to be placed in its reset state ready to receive a new card in the magnetic reader 10 to initiate a new transaction.

There are four other inputs to the Or gate 47 which may initiate this transaction termination pulse, the "card out", and reset pulse from the output of the one-shot multivibrator 49. These are the abnormal system operations which require the user to reinitiate the transaction by inserting the card into the reader 10 again or, in the event that the card is faulty or counterfeit, will prevent the initiation of a transaction. In addition, if the user for some reason does not insert his card into the reader 10 all the way or for any reason the sequence of events is not as described above for a normal transaction, any transaction which may be partially initiated by the computer data processing system 12 is terminated.

For example, if there is a parity check failure in any character, including the start character, the parity check decoding circuit 20 produces an output to set a latch circuit 50, the output of which is a "parity error" indication. As mentioned above, this normally does not occur. Whenever the latch circuit 50, however, is set, the output is passed through the Or gate 47 to terminate the transaction and to trigger the one-shot multivibrator 49 to produce the card out and reset pulse described previously. Thus, the card is ejected from the reader 10 and must be reinserted to reinitiate the transaction whenever a parity check error occurs on any character being processed by the system.

If, for some reason, the user should insert a card part-way into the magnetic reader 10 without inserting it far enough to cause the reading of an end character, the system functions to terminate the transaction and set the card out of the reader. To accomplish this purpose, the output of the Inhibit gate 26 is applied as an enable input to an And gate 53. The other input to the And gate 53 is obtained from the output of the time counter 30 described previously. If no end character is received before the time out count of the counter 30 occurs, the output of the counter 30 appears on the lead 34 and is passed by the gate 53. This results in two functions. First, an inhibit input is applied to the Inhibit gate 28 to remove the enable signal from the data processing system 12. At the same time, the output of the gate 53 is passed through the Or gate 47 which results in a terminate transaction signal applied to the data processing circuit 12 and triggers the one-shot multivibrator 49 to produce the system reset pulse and the card out signal to the reader 10, as described previously.

If, for some reason, the card inserted into the reader 10 causes the production of clock pulses on the lead 15 without the system detecting either a start or an end character within some pre-established period of time, it is desirable to terminate any transaction which may have been initiated and again to reset the system and set the card out of the reader. This is accomplished by applying the clock pulses on the lead 15 to a latch circuit 55 which is set by the first clock pulse applied to it from the output of the reader 10 after a system reset from the output of the one-shot multivibrator 49 which placed the latch circuit 55 in its stand-by condition. A differentiating circuit 56 is connected to the output of the latch circuit 55 to produce a pulse only when the latch circuit 55 changes its state from its reset condition to its latch condition in response to the first clock pulse from the reader 10. The output of the circuit 56 is a reset pulse applied to a time counter circuit 58 which is advanced in its count by pulses from the free-running clock 31 which also supplies pulses to the time counter 30.

The counter 58 produces output pulses periodically at fixed time intervals for resetting a clock counter circuit 60. These reset pulses from the counter 58 are selected to occur at a frequency which normally results in the count of pulses on the lead 15 by the counter 60 being less than a pre-established limit which normally ensures that either a start or an end character should be detected by the system. The outputs of the latches 25 and 40, connected to the start decode circuit 21 and end decode circuit 22, are applied as inputs to an Or gate 62, the output of which is connected to the inhibit input of an Inhibit gate 63. Thus, whenever either of these latch circuits are set in response to the decoding of the respective "start" and "end" characters, the gate 63 is prevented from passing any pulses through it to the Or gate 47. The output of the clock counter 60 is connected to a latch circuit 64 which produces an output signal supplied to the Inhibit gate 63 whenever the maximum count of the clock counter is reached before the counter 58 resets the counter 60. If no start or end characters have been received by the time the latch circuit 64 is set, the Inhibit gate 63 passes th signal produced by the latch circuit 64 through the Or gate 47. As mentioned previously, this terminates the transaction and resets the system.

One other sequence of operation is used to terminate transactions and to set the card out of the reader and reset the system. This sequence is whenever an "end" character is detected before a "start" character. If this occurs, an Inhibit gate 66 permits the passage of a signal from the output of the latch circuit 40 connected to the end character decoding circuit 22. This signal then is applied to the Or gate 47 to terminate the transaction and to trigger the one-shot multivibrator 49 to perform the functions described previously for this occurrence. From an examination of FIG. 1, it is apparent that whenever the start character occurs before the end character, the output of the latch circuit 25 inhibits the passage of any signals through the Inhibit gate 66 since the latch circuit 25 output is connected to the inhibit input of the Inhibit gate 66.

As mentioned previously, the output of the one-shot multivibrator 49 is used to reset the system to ready it for initiation of a new transaction by insertion of a new card or re-insertion of a card into the reader 10. The output of the one-shot multivibrator 49 is applied to each of the latch circuits 25, 36, 40, 46, 50, 55 and 64 to reset these circuits to their stand-by or system-ready condition of operation. In addition, this reset pulse is applied to the comparator 44, the LRC calculate circuit 19, the five-bit counter 42, the counter 18 and the reader 10 to function as the system reset pulse and the "card out" signal to the reader described previously.

As a result of the foregoing system operation, it is not necessary to employ a separate "card-in" switch of any type in the reader 10 to ensure that a card has been fully inserted into the reader to initiate and complete a transaction. All of the signals for ascertaining this are provided by the data reading channel of the reader 10 itself, as described previously. In addition to the character-by-character parity check which is provided by the parity check decoding circuit 20, it also may be desirable to provide a total sum check character of all of the data. This can be accomplished in a standard manner and added to the circuit shown in FIG. 1, if desired.

Although the foregoing description has been made in conjunction with the circuit shown in the block diagram in FIG. 1, the functions which are accomplished by that circuit also may be accomplished by means of software programming of a microprocessor or other computer incorporated within the system 12. The system may be implemented either by means of software providing such programming or by means of hardware, such as described in conjunction with FIG. 1.

Figure 2:
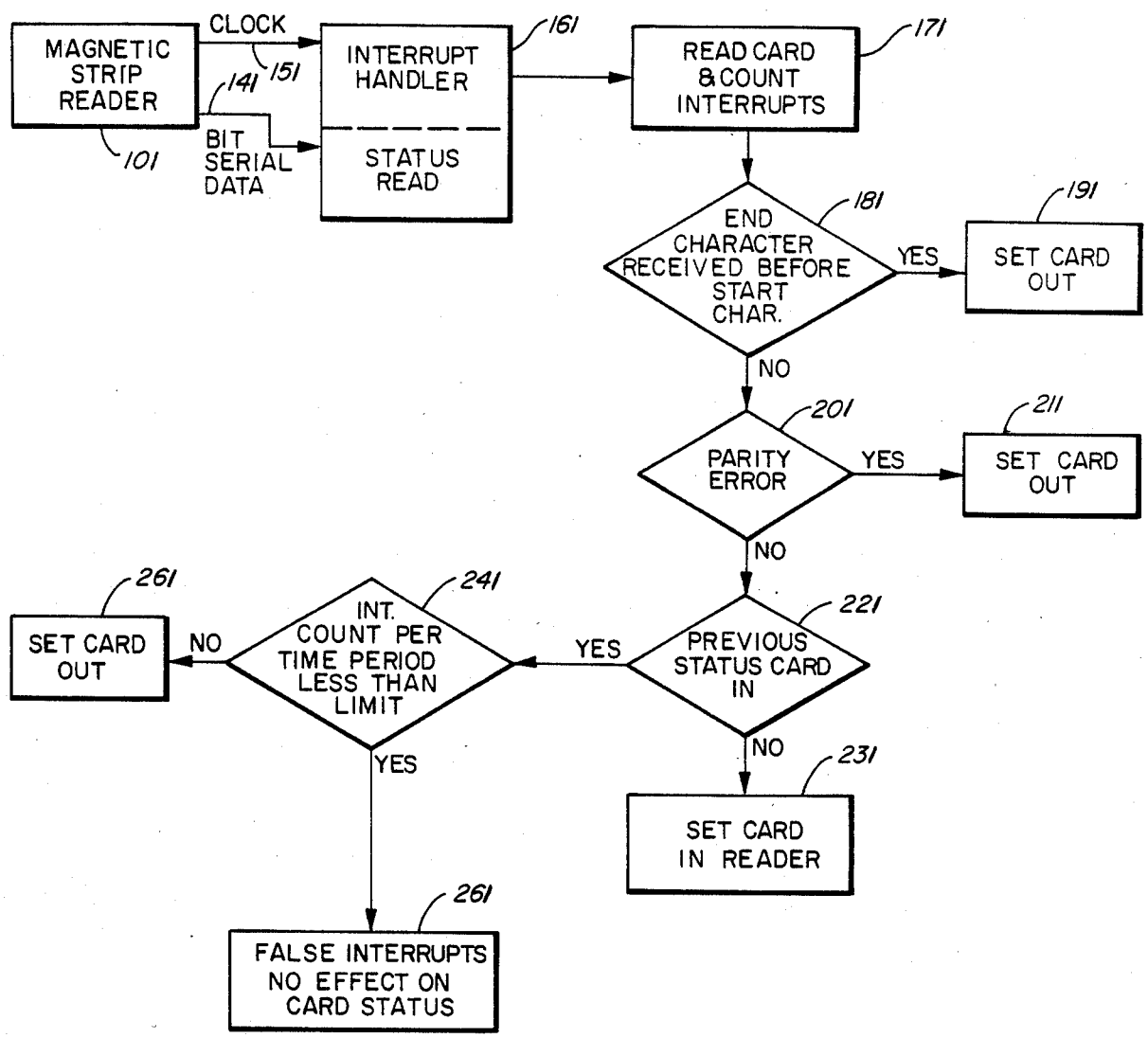
FIG. 2 is a flowchart of the operation of the embodiment shown in FIG. 1.

FIG. 2 is a flow chart of the operation of such a system, implemented either by means of hardware or software, to provide the results mentioned above in the description of the operation of the circuit of FIG. 1. In FIG. 2, a magnetic strip reader 101 is shown providing outputs over a clock lead 151 and the a serial data output lead 141, as described previously. These are shown as being applied to an interrupt handler and status read function block 161 which may be incorporated into the microcomputer control program. The "interrupt handler" simply provides a count each time a negative-going transition occurs in the clock pulses signal train (illustrated in waveform A of FIG. 3). Each interrupt then is used to read the status of the data obtained over the lead 141 in a manner comparable to that described above in conjunction with the description of the operation of the circuit shown in FIG. 1. This information is used to read the data on the card and to count the interrupts to determine when the serial bit information is to be organized into characters to be interpreted or decoded by the computer. This is shown by means of the block 171 in FIG. 2.

The next decision point in the system is to determine whether an end character is received before a start character, as shown by block 181. If this occurs, the card is set out of the reader, as shown in block 191, and the further processing of the transaction is terminated. If the end character is not received before a start character, the data given a further parity error check, and an LRC check as shown in block 201. If there is a parity or LRC error, the card is set out of the reader as indicated by block 211. If there is no parity or LRC error and if the start character is received before the end character, a "previous status card in" determination is made by block 221. If there was no previous status indicating that a card has been inserted into the reader without being withdrawn from it, the card is set into the reader as shown by block 231 and a normal processing of the data is used to initiate and complete a transaction.

If the "previous status card in" block 221, however, indicates such a status, an interrupt count for a time period less than a limit decision is made by block 241. This is comparable to the operation of the free-running clock and counter which have been described previously in conjunction with FIG. 1. If the interrupt counts within the pre-established time limit are less than a predetermined limit, they are assumed to be false (possibly generated by noise or very slight movement of the card due to vibration), and are ignored; i.e., the previous status of card in or out is not altered. If the quantity of interrupt pulses, however, are greater than the pre-established limit per time period, this decision is interpreted as an unacceptable error, and the card status is set to "card out", as indicated by block 261 in FIG. 2.

The foregoing description has been made in conjunction with a preferred embodiment of the invention. Various changes and modifications will occur to those skilled in the art without departing from the true scope of the invention. Various modifications to the circuitry of FIG. 1 may be employed to achieve the results desired. In addition, as indicated above, all or most of the circuit functions shown in FIG. 1 may be implemented by means of software programming of a microprocessor forming a part of the computer and data processing system. Such modifications come within the scope of the invention as defined in the following claims. The embodiment which has been shown and described is to be considered illustrative only, and not as specifically limiting the invention to the form used to describe and illustrate it.

We claim:

1. For use wth a document reading system in which each document has data characters separated by a start character and an end character, a document presence indication and transaction termination system including in combination:
   means for reading a document inserted therein and producing signals on an output thereof representative of the sequence of characters encoded on such documents;
   identifying mean coupled to the output of said reading means for identifying at least said start and end characters and producing signals representative thereof;

utilization means coupled with the output of said reading means for utilizing data signals supplied thereto corresponding to the data characters on said documents; and means coupled with said identifying means and coupled with at least said utilization means for initializing and maintaining a transaction operation in response to identification of a start character before an end character in the sequence of characters read by said reading means and for terminating a transaction operation initiated by a document in said reading means in response to identification of an end character before a start character by said identifying means.

2. The combination according to claim 1 wherein said transaction terminating means further is coupled with said reading means for terminating the reading of a document therein in response to the identification of an end character before a start character by said identifying means.

3. The combination according to claim 1 wherein said means for reading documents comprises a magnetic card reader and said documents comprise magnetically-encoded cards inserted therein, and wherein the data on said cards comprises a strip of binary magnetic coded characters in which the data characters are separated by a start character and an end character and in which the start character normally is read by said reading means at the beginning of a transaction and the end character is read by said reading means after the reading of data characters on the document by said magnetic card reader.

4. The combination according to claim 1 further including timing means coupled wioth the output of said reading means and coupled with at least said utilization means for terminating a previously initiated transaction in said utilization means in the absence of signals on the output of said reading means for a predetermined time interval.

5. The combination according to claim 1 wherein documents for use with the document reading system have the data thereon encoded with parity check information; said identifying means coupled with the output of said reading means further includes means for identifying a parity check error and producing a signal corresponding to such parity check error; and said transaction terminating means coupled with said identifying means also is responsive to such parity check error signal for terminating the transaction in said utilization means.

6. The combination according to claim 1 wherein said means for reading documents comprises a magnetic strip card reader; documents inserted into said card reader comprise magnetically-encoded cards in which the data thereon is read by said card reader to produce a series output signal on the output thereof; and said magnetic card reader further produces clock signals supplied to said identifying means for causing the decoding of data characters thereby at a variable rate determined by the speed of movement of a document card in said card reader.

7. The combination according to claim 6 wherein said timing means is reset by clock pulses from said magnetic strip reader and wherein said clock pulses are produced by said magnetic strip reader in response to the movement of document cards in said reader.

8. The combination according to claim 7 wherein documents for use with the document reading system have the data thereon encoded with parity check information; said identifying means coupled with the output of said reading means further includes means for identifying a parity check error and producing a signal corresponding to such parity check error; and said transaction terminating means coupled with said identifying means also is responsive to such parity check error signal for terminating the transaction in said utilization means.

9. The combination according to claim 8 wherein said transaction terminating means further is coupled with said reading means for terminating the reading of a document therein in response to the identification of an end character before a start character by said identifying means.

10. The combination according to claim 6 further including timing means coupled with the output of said reading means and coupled with at least said utilization means for terminating a previously initiated transaction in said utilization means when no end character has been identified on the output of said reading means for a predetermined time interval.

11. The combination according to claim 2 wherein said means for reading documents comprises a magnetic card reader and said documents comprise magnetically-encoded cards inserted therein, and wherein the data on said cards comprises a strip of binary magnetic coded characters in which the data characters are separated by a start character and an end character and in which the start character normally is read by said reading means at the beginning of a transaction and the end character is read by said reading means after the reading of data characters on the document by said magnetic card reader.

12. The combination according to claim 11 further including timing means coupled with the output of said reading means and coupled with at least said utilization means for terminating a transaction in said utilization means in the absence of signals on the output of said reading means for a predetermined time interval.

* * * * *